(12) United States Patent
Ruckman et al.

(10) Patent No.: US 11,892,756 B2
(45) Date of Patent: Feb. 6, 2024

(54) FIXATION SYSTEM OF A STRAP TO A CAMERA INCLUDING A BUCKLE AND A BUTTON

(71) Applicant: GOBE CORP UK Ltd, London (GB)

(72) Inventors: Anton Ruckman, Byron Bay (AU); Josefina Piccardo, Byron Bay (AU); Christian Gibson, Byron Bay (AU)

(73) Assignee: GOBE CORP UK Ltd, London (GB)

( * ) Notice: Subject to any disclaimer, the term of this patent is extended or adjusted under 35 U.S.C. 154(b) by 45 days.

(21) Appl. No.: 17/356,093

(22) Filed: Jun. 23, 2021

(65) Prior Publication Data

US 2022/0011654 A1 Jan. 13, 2022

(30) Foreign Application Priority Data

Jul. 8, 2020 (EP) .................................... 20184774

(51) Int. Cl.
| | | |
|---|---|---|
| *G03B 17/56* | (2021.01) | |
| *A44B 13/00* | (2006.01) | |
| *A45F 5/00* | (2006.01) | |

(52) U.S. Cl.
CPC ........ *G03B 17/561* (2013.01); *A44B 13/0058* (2013.01); *A45F 5/00* (2013.01); *A45F 2200/0533* (2013.01)

(58) Field of Classification Search
CPC ..... G03B 17/561; A44B 13/0058; A45F 5/00; A45F 2200/0533
USPC ....................................................... 24/591.1
See application file for complete search history.

(56) References Cited

U.S. PATENT DOCUMENTS

| | | | | |
|---|---|---|---|---|
| 278,430 | A * | 5/1883 | Henius ...................... | A41F 1/00 24/666 |
| 1,222,264 | A | 4/1917 | Cabanne | |
| 4,188,851 | A * | 2/1980 | Wolf ...................... | G10G 5/005 84/327 |
| 4,993,127 | A * | 2/1991 | Mechem ................ | G10G 5/005 24/324 |
| 6,226,845 | B1 * | 5/2001 | Fink ........................ | A41F 11/04 24/666 |
| 7,234,210 | B2 * | 6/2007 | Stiles ................. | A41D 13/0512 29/434 |
| 9,247,787 | B2 * | 2/2016 | Dering ................... | A44B 11/25 |

(Continued)

FOREIGN PATENT DOCUMENTS

DE 202009000034 U1 6/2009

OTHER PUBLICATIONS

Extended European Search Report dated Dec. 3, 2020, issued in corresponding Application No. EP 20184774.6, filed Jul. 8, 2020, 11 pages.

*Primary Examiner* — David M Upchurch
(74) *Attorney, Agent, or Firm* — Christensen O'Connor Johnson Kindness PLLC

(57) ABSTRACT

This buckle for a fixation system of a strap to a camera includes a plate and a means for attaching the plate to a strap, the plate including a first hole, a second hole and a protrusion located between the first and second holes. A button may be received in the second hole only by inserting it in the first hole and then moving it from the first hole into the second hole, and removed from the buckle only by moving it from the second hole into the first hole and then removing it from the first hole. The plate further includes a slit extending from the second hole towards an outer edge of the plate.

15 Claims, 5 Drawing Sheets

(56) References Cited

U.S. PATENT DOCUMENTS

2006/0021202 A1\* 2/2006 English .................... A41F 9/02
 24/301
2015/0113772 A1 4/2015 Dering et al.

\* cited by examiner

FIXATION SYSTEM OF A STRAP TO A CAMERA INCLUDING A BUCKLE AND A BUTTON

BACKGROUND

Embodiments of the present disclosure relates to the technical field of fixation systems for attaching a strap to a camera.

Camera straps are commonly used by camera users. Mainly, camera straps are used in order to hold the camera when allowing the user to perform other actions. It may be useful, in order to render the camera less cumbersome or to replace the camera strap when it is worn, to make the fixation of the camera strap to the camera releasable.

Various systems may be used for attaching a camera strap to a camera. Nevertheless, the existing systems are hard and expensive to manufacture and have little reliability.

For instance, one may refer to document US 2015/113772 which discloses an example of such a camera strap attachment mechanism. In this mechanism, a buckle attached to the strap includes an aperture and a hole each able to receive a button attached to the camera. A rib extending radially outwards from the button makes it impossible to remove the button from the hole without passing it through the aperture. To attach the camera to the strap, the button is passed through the aperture and, then, from the aperture into the hole. A spring prevents undesired displacement of the button from the hole to the aperture.

Although such a mechanism is generally considered satisfying, the spring may break or its fixation to the mechanism may change in such a way that it no longer prevents the button from moving into the aperture. This results in rendering the camera strap attachment mechanism unreliable.

SUMMARY

Embodiments of the present disclosure aim at overcoming the above-mentioned drawbacks.

More specifically, the invention aims at providing a fixation system of a strap to a camera which is more reliable, cheaper to manufacture and easy to use.

According to a first aspect of the invention, it is proposed a buckle for a fixation system of a strap to a camera, including a plate and a means for attaching the plate to a strap, the plate including a first hole able to receive a button of the fixation system, a second hole able to receive the button, and a protrusion located between the first and second holes, the first hole being located between the means for attaching and the second hole, the first and second holes being so arranged that the button may be received in the second hole only by inserting it in the first hole and then moving it from the first hole into the second hole, and so arranged that the button may be removed from the buckle only by moving it from the second hole into the first hole and then removing it from the first hole.

According to one of its general features, the plate further includes a slit extending from the second hole towards an outer edge of the plate.

The slit cooperates with the protrusion to prevent the button from moving into the first hole, when the user does not make any significant effort to move the button. Hence, the slit makes it possible to prevent undesired removal of the button without requiring to add a spring. The reliability of the fixation system is thus increased.

In an advantageous embodiment, the slit is rectilinear and extends, from the second hole, into a direction opposite the means for attaching.

The slit having these features is particularly efficient when it cooperates with the protrusion to prevent undesired removal of the button without requiring to add a spring.

Preferably, the slit extends, from the second hole, into a rectilinear direction passing through a centre of gravity of the first hole and a centre of gravity of the second hole.

Such an arrangement maximizes even more the efficiency of the slit preventing undesired removal of the button.

In a further embodiment, the first and second holes have a circular cross-section in the plane of the plate, the second hole having a smaller diameter in cross-section than a diameter in cross-section of the first hole.

Such an arrangement allows an optimal interaction of the buckle with a button of a fixation system of a strap to a camera.

One may also foresee that the first hole and/or the second hole includes a chamfer.

Such a chamfer renders easier to insert the button in the first hole in order to attach the strap to the camera.

Preferably, the angle of the chamfer with respect to the plane of the plate is within a range 40° to 50°.

In another embodiment, the slit has a width within a range 3 mm to 5 mm.

According to another aspect of the invention, it is proposed a button for a fixation system of a strap to a camera, the button being intended to be received in a buckle of the fixation system for fixation of a strap to the camera, the button including a first frontal surface, a second frontal surface, a cord secured to the button between the first and second frontal surfaces and intended to be attached to a camera, and a cylindrical surface extending between the first and second frontal surfaces.

According to one of its general features, the button includes a groove extending inwards from the cylindrical surface.

The groove located as above defined allows a better freedom of motion of the cord in rotation around the axial direction the cylindrical surface, which makes the fixation system more comfortable to the user.

Preferably, the cylindrical surface has a circular axial cross section.

Such a shape of the cylindrical surface allows having an optimal interaction with a buckle of the fixation system of a camera to a strap.

In another embodiment, the first frontal surface and the second frontal surface are plane and parallel to each other.

Such a design renders the manufacturing process of the button easier and cheaper.

In a further embodiment, the groove includes at least one tapered surface.

Preferably, the tapered surface forms an angle, with respect to the axis of the cylindrical surface, within a range 40° to 50°.

In another embodiment, the groove includes a bottom cylindrical surface.

Preferably, the bottom cylindrical surface has a width within a range 1 mm to 2 mm.

Such a dimension is particularly well adapted to a dimension of a cord intended to be attached to a camera.

According to a further aspect of the invention, it is proposed a fixation system of a strap to a camera including a buckle as defined above and/or a button as defined above.

According to a further aspect of the invention, it is proposed a use of a fixation system as defined above for attaching a strap to a camera.

DESCRIPTION OF THE DRAWINGS

The present invention and its advantages will be better understood by studying the detailed description of a specific embodiment given by way of nonlimiting examples and illustrated by the appended drawings on which.

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
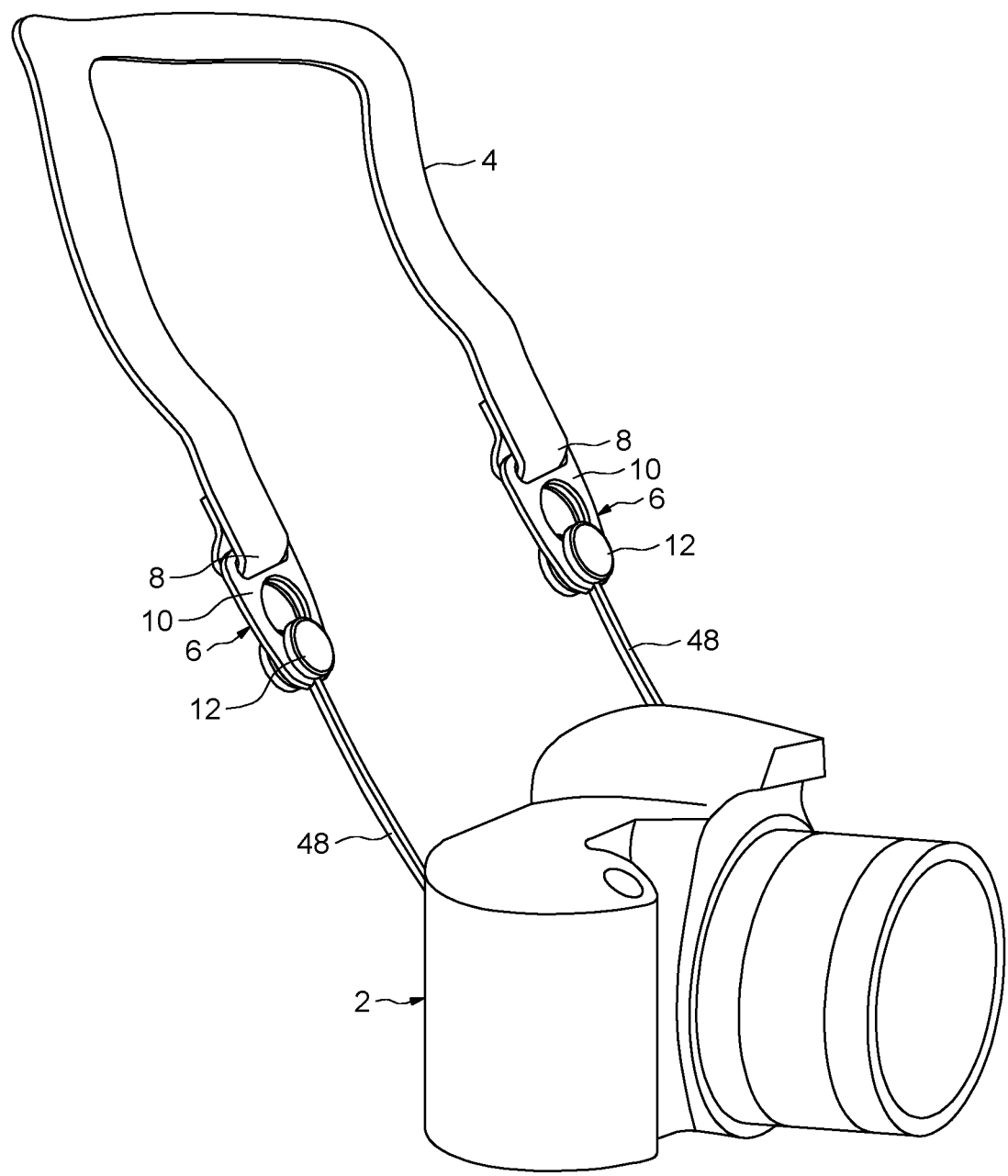
FIG. 1 is an isometric view of a fixation system according to an aspect of the invention.

With reference to FIG. 1, it is schematically depicted a camera 2 and a strap 4. The strap 4 may be passed around a neck of a user (not depicted) in such a way that the camera 2 may be supported without the user having to hold it with its hands.

Figure 2:
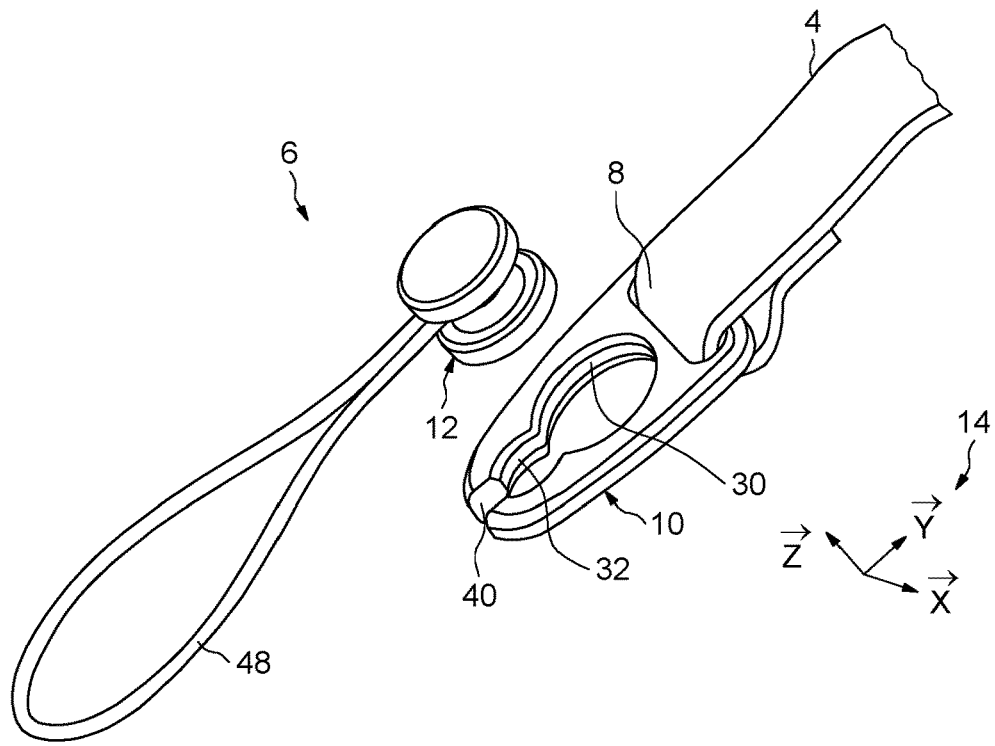
FIG. 2 is an isometric view of a buckle and a button of the fixation system of FIG. 1.

To that end, two fixation systems 6 are foreseen for attaching each respective end 8 of the strap 4 to the camera 2. Referring to FIGS. 1 and 2, each fixation system 6 includes a buckle 10 and a button 12.

It is defined an orthonormal direct vector basis 14 attached to the buckle 10. The basis 14 consists of a vector X, a vector Y and a vector Z.

In the present application, terms "horizontal", "vertical", "low" and "up" will be understood as referring relative to the basis 14 when the buckle 10 is normally installed on a horizontal flat surface, that is assuming that the vector Z is vertically upwardly directed.

The word "cylindrical" will be understood according to its common definition, being namely that a cylindrical surface is a surface consisting of all the points on all the lines which are parallel to a given line and which pass through a fixed plane curve in a plane not parallel to the given line.

Figure 3:
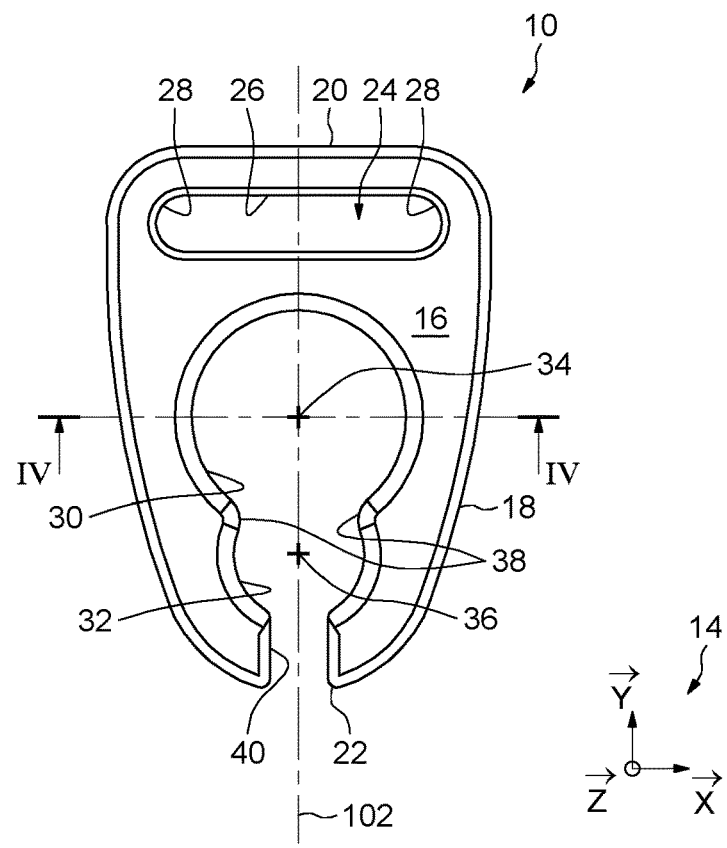
FIG. 3 is a top view of the buckle of FIG. 2.

Referring now to FIG. 3, the buckle 10 includes a horizontal plate 16 outwardly delimited by an outer edge 18. The outer edge 18 has a rounding visible on FIG. 4.

In the horizontal plane, the plate 16 has an elongated shape with two longitudinal ends 20 and 22. The end 20 is intended to be closer to the strap 4 than the end 22, whereas the end 22 is intended to be closer to the camera 2 than the end 20.

The plate 16 is symmetrical with respect to a first plane of symmetry 100 (depicted on FIG. 4) perpendicular to the vector Z and symmetrical with respect to a second plane of symmetry 102 perpendicular to the vector X.

Proximate to the end 20, the buckle 10 includes a through orifice 24. The orifice 24 has an elongated shape along the direction of the vector X. More specifically, the orifice 24 includes a central, rectangular portion 26 and two semi-circular portions 28 symmetrical with reference to the plane 102. The rectangular portion 26 has a length 126 along the direction of the vector X and a width w26 along the direction of vector Y. In the disclosed example, the length 126 is between 16 mm and 18 mm and the width w26 is between 3 mm and 5 mm. The semi-circular portions 28 extend respectively from the smaller sides of the portion 26 and have a diameter d28 equal to the width w26. The edge of the orifice 24 has a rounding similar to the rounding of the edge 18.

By virtue of this arrangement, the end 8 of the strap 4 may be inserted within the orifice 24. It is thus possible to attach the strap 4 to the buckle 10.

The plate 16 further includes two through holes 30 and 32. The holes 30 and 32 have a horizontal circular cross-section. More specifically, the centres 34 and 36 of the respective circular cross-sections of the holes 30 and 32 are located in the plane 100. The centre 36 of the hole 32 is located, along the direction of the vector Y, between the centre 34 of the hole 30 and the end 22.

The diameter d30 of the horizontal circular cross-section of the hole 30 is larger than the diameter d32 of the horizontal circular cross-section of the hole 32. More specifically, the diameter d32 is within a range 9 mm to 10.2 mm and the diameter d30 is within a range 15 mm to 16.2 mm.

The distance between the centres 34 and 36 is smaller than the mean of the diameters d30 and d32 multiplied by a factor 0.8. More specifically, the distance between the centres 34 and 36 is within a range 8.4 mm to 9.2 mm. Hence, the holes 30 and 32 communicate with each other in such a way to form a pair of protrusions 38. The protrusions 38 are located between the holes 30 and 32. Each protrusion 38 extend along the direction of vector X towards the plane of symmetry 102. The distance d38 between the protrusions 38 is less than the diameter d32. In the depicted embodiment, when no effort is exerted on the plate 16, the distance d38 between the protrusions 38 is within a range 7.2 mm to 8 mm.

The plate 16 includes a slit 40. The slit 40 is rectilinear along the direction of vector Y. More specifically, the slit 40 extends between the hole 32 and the edge 18 at the end 22 of the plate 16. Hence, the slit 40 extends from the hole 32 along the direction of the alignment of the centres 34 and 36 and into a direction opposite to the orifice 24. The width $w_{40}$ of the slit 40 along the direction of the vector X is between 3 mm to 5 mm.

Figure 4:
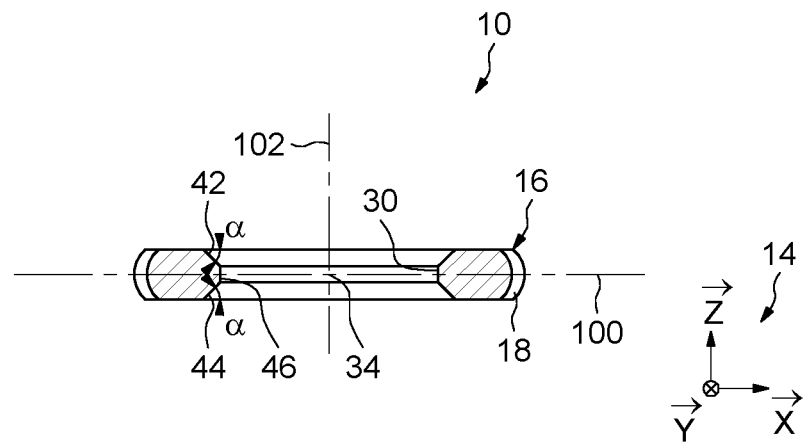
FIG. 4 is a cross-sectional view of the buckle of FIGS. 2 and 3.

FIG. 4 depicts a cross-section of the buckle 10 taken along a plane perpendicular to the vector Y and passing through the centre 34. The holes 30, 32 and the slit 40 include two opposite chamfers 42 and 44. The chamfers 42 and 44 extend, from the two respective horizontal faces of the plate 16, towards the plane 100. The angle α of the chamfers 42 and 44 is within a range 40° to 50°. Between the chamfers 42 and 44, a cylindrical or rounded surface 46 delimits radially, inwardly the holes 30, 32 and the slit 40.

Figure 5:
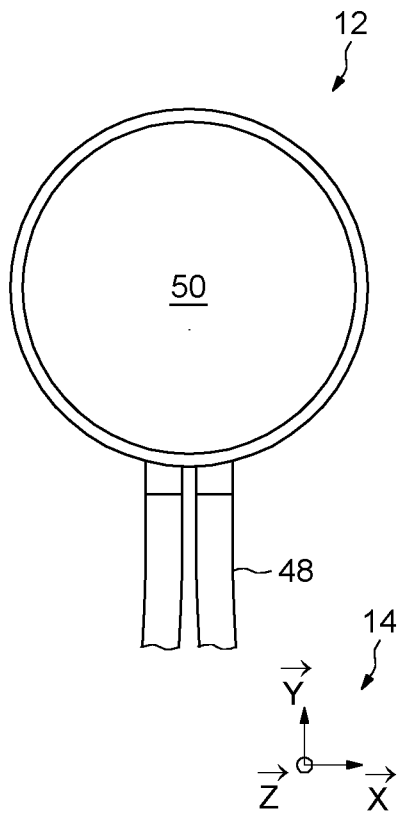
FIG. 5 is a top view of a button of the fixation system of FIG. 2.

Referring now to FIGS. 1, 2 and 5, the button 12 includes a cord 48. The cord 48 is intended to be attached to the camera 2 by means, for instance, of a lanyard hitch.

Figure 6:
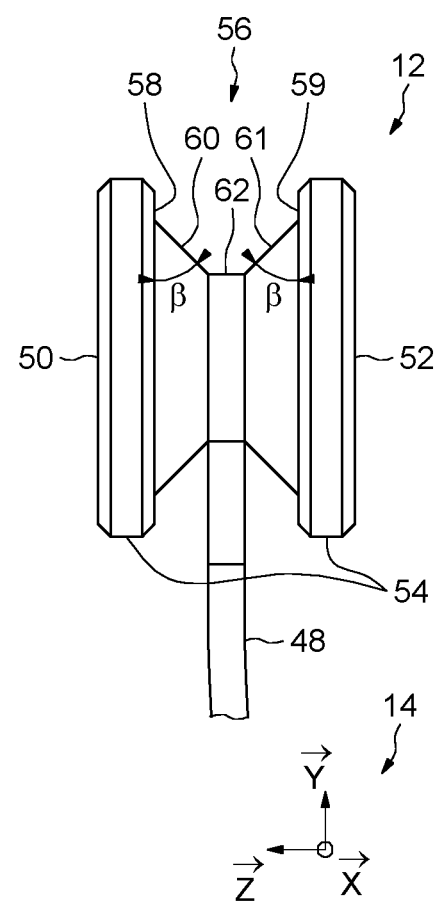
FIG. 6 is a side view of the button of FIGS. 2 and 5.

With reference to FIG. 6, the button 12 includes an upper frontal surface 50 and a lower frontal surface 52. The surfaces 50 and 52 are plane and perpendicular to the direction of the vector Z. The surfaces 50 and 52 are substantially identical, circular and having a diameter d12 slightly larger than the diameter d30. In the depicted embodiment, the diameter d12 is within a range 14 mm to 16 mm. The distance 112 along the direction of the vector Z between the surfaces 50 and 52 is within a range 9.5 mm to 10 mm.

The button 12 includes a cylindrical surface 54. The surface 54 extends between outer edges of the frontal surfaces 50 and 52. Hence, the surface 54 is a cylinder of revolution around an axis passing by the centres of the surfaces 50 and 52. The axial cross-section of the cylindrical surface 54 has the same diameter d12 as the diameter of the surfaces 50 and 52.

The button 12 includes a groove 56. The groove 56 extends radially inwards from the cylindrical surface 54. More specifically, the groove 56 includes a pair of frontal surfaces 58, 59 perpendicular to the vector Z, a pair of tapered surfaces 60, 61 and a bottom surface 62. The distance d58-59 along the direction of the vector Z between the frontal surfaces 58 and 59 is slightly larger than the distance between the two opposite horizontal faces of the plate 16. In the depicted embodiment, the distance d58-59 is between 4.4 mm to 4.8 mm. The angle β of the tapered surfaces 60 and 61 with respect to the direction of the vector Z is slightly the same as the angle α. In the depicted embodiment, the angle β is within a range 40° to 50°. The width w62 of the bottom surface 62 along the direction of the vector Z is within the range 1 mm to 2 mm. The bottom surface 62 has a axial circular cross-section around the same axis as the circular cross-section of the cylindrical surface 54. The axial cross-section of the bottom surface 62 has a diameter d62 which is larger than the width w40 and slightly smaller than the diameter d32. In the depicted embodiment, the diameter d62 is within a range 8.5 mm to 9 mm.

As visible on FIG. 6, the cord 48 extends from the bottom surface 62. Hence, the freedom of motion of the cord 48 with respect to the button 12 is increased, especially in a rotation around the direction of the vector Z.

To attach the strap 4 to the camera 2, one firstly attaches the buckle 10 to an end 8 of the strap 4. To do so, the end 8 is passed through the orifices 24. This fixation may be implemented by means of a length adjusting buckle (not depicted) provided on a remote portion of the strap 4.

In the meantime, one attaches the cord 48 to the camera 2, for instance by means of a lanyard hitch.

Figure 7:
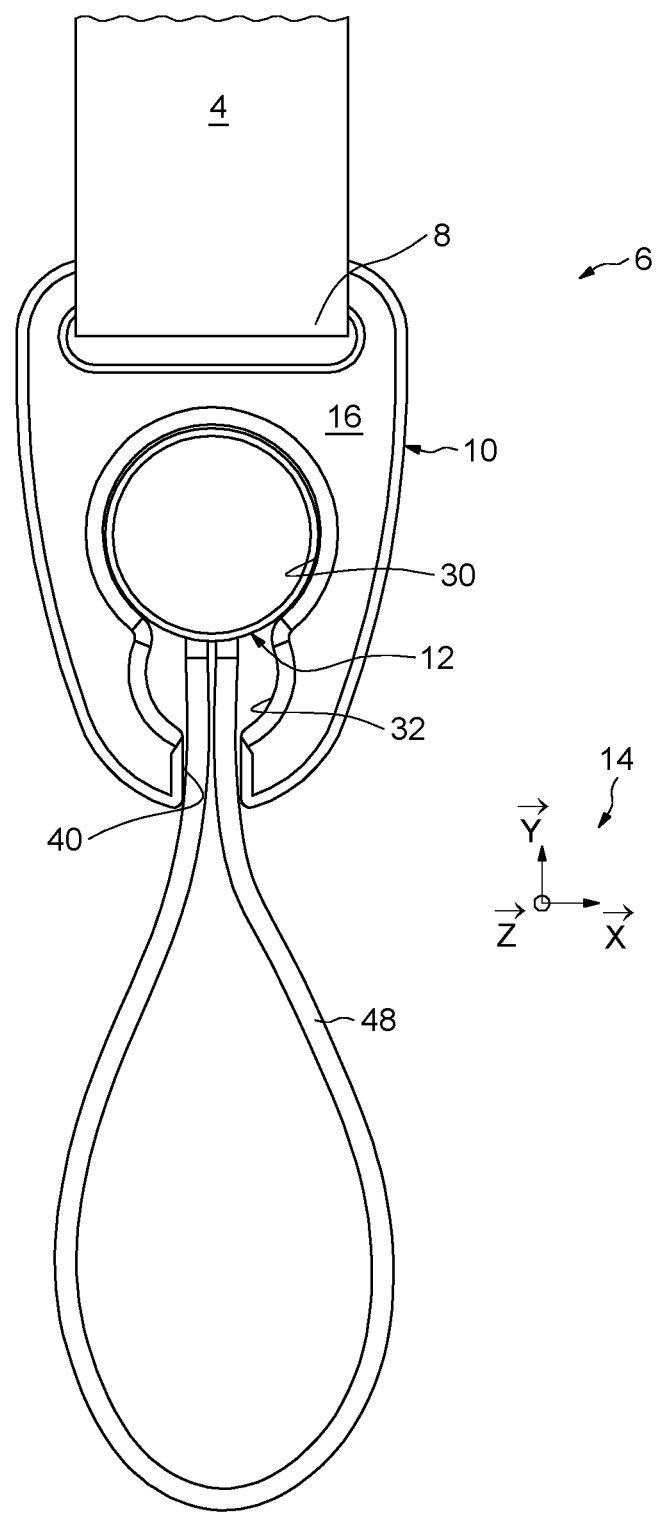
FIG. 7 is a top view of the fixation system of FIG. 2 in unlocked position.

Then, the button 12 is inserted within the hole 30 as depicted in FIG. 7. To do so, the button 12 may be positioned, relative to the plate 16, in such a way that the outer edges of the frontal surfaces 50 and 52 are coaxial with the hole 30. Hence, the button 12 may be moved in translation along the direction of the vector Z into a position wherein the plate 16 is located between the frontal surfaces 50 and 52. The cord 48 is oriented along and in opposite direction to the vector Y in order to be passed through the hole 32 and the slit 40, as depicted on FIG. 7.

Figure 8:
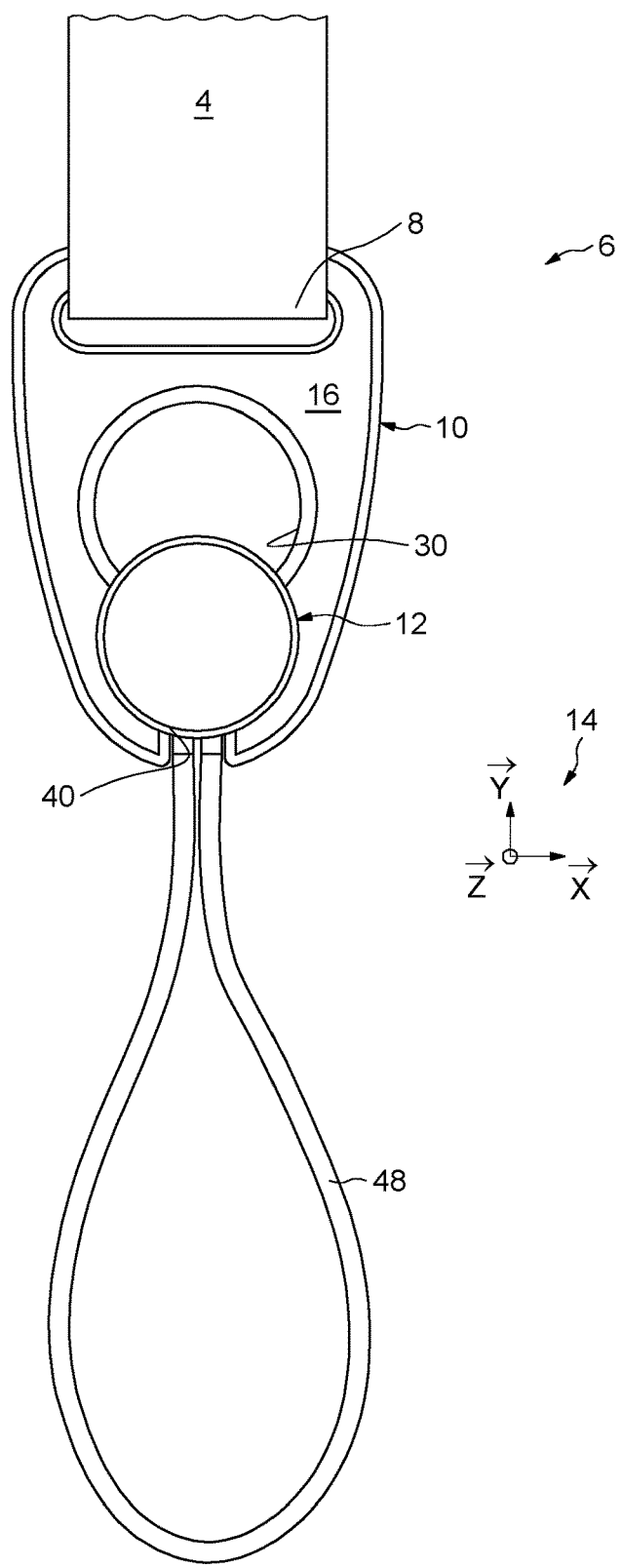
FIG. 8 is a top view of the fixation system of FIGS. 2 and 7 in locked position.

After the button 12 has reached this position, it is moved by the user from the hole 30 to the hole 32. During this movement, the slit 40 allows the distance between the protrusions 38 to increase slightly. The button 12 may thus enter the hole 32 and be positioned in the position depicted on FIG. 8. Thanks to the elastic return of the plate 60 into its original shape, the distance between the protrusions 38 decreases back to its original value as soon as the button has entered the hole 32. Hence, the button 12 is prevented from returning into the hole 30.

The camera 2 is thus firmly attached to one end of the strap 4. The same actions are performed with the other fixation system 6 on the other end 8 in order to firmly attach the camera 2 to the strap 4. Furthermore, due to the absence of a spring, the reliability of the fixation system is increased.

To release the attachment of the camera 2 to the strap 4, the same actions are performed in reverse order. That is, the button 12 is firstly moved from the hole 32 to the hole 30. By virtue of the slit 40, the effort of the user to move the button 12 moves the protrusions 38 from each other and the button 12 may reach the position as depicted on FIG. 7. Then, the button 12 may be moved vertically in order to be removed from the hole 30. At this time, the camera 2 is no longer attached to the strap 4.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The invention claimed is:

1. A buckle for a fixation system of a strap to a camera, the buckle comprising a plate and a through orifice configured to attach the plate to a strap, the plate including a first hole able to receive a button of the fixation system, a second hole able to receive the button, and a protrusion located between the first and second holes, the first hole being located between the through orifice and the second hole, the first and second holes being so arranged that the button may be received in the second hole only by inserting the button in the first hole and then moving the button from the first hole into the second hole, and so arranged that the button may be removed from the buckle only by moving the button from the second hole into the first hole and then removing the button from the first hole, wherein the plate further includes a slit extending from the second hole towards an outer edge of the plate, wherein the first and second holes have a circular cross-section in a plane of the plate, the second hole having a smaller diameter in cross-section than a diameter in cross-section of the first hole, the distance between the center of the first hole and the center of the second hole being smaller than the mean of the diameters of the first and second holes multiplied by a factor of 0.8.

2. The buckle according to claim 1, wherein the slit is rectilinear and extends, from the second hole, toward a direction opposite the through orifice.

3. The buckle according to claim 1, wherein the slit extends, from the second hole, into a rectilinear direction passing through a center of gravity of the first hole and a center of gravity of the second hole.

4. The buckle according to claim 1, wherein the diameter in cross-section of the first hole is within a range of 14.6 mm to 16.6 mm and/or wherein the diameter in cross section of the second hole is within a range of 8.6 mm to 10.6 mm.

5. The buckle according to claim 1, wherein the first hole and/or the second hole includes a chamfer.

6. The buckle according to claim 5, wherein the angle (α) of the chamfer with respect to the plane of the plate is within a range of 40° to 50°.

7. The buckle according to claim 1, wherein the slit has a width within a range of 3 mm to 5 mm.

8. A button for a fixation system of a strap to a camera, the button being intended to be received in a buckle of the fixation system for fixation of the strap to the camera, the button comprising a first frontal surface, a second frontal surface, a cord secured to the button between the first and second frontal surfaces and intended to be attached to the camera, and a cylindrical surface extending between the first and second frontal surfaces, wherein the button includes a groove extending inwards from the cylindrical surface, the groove comprising a pair of frontal surfaces, a pair of tapered surfaces and a bottom surface, the cord extending from the bottom surface.

9. The button according to claim 8, wherein the cylindrical surface has a circular axial cross section.

10. The button according to claim 8, wherein the first frontal surface and the second frontal surface are plane and parallel to each other.

11. The button according to claim 8, wherein the at least one tapered surface forms an angle (β), with respect to the axis of the cylindrical surface, within a range of 40° to 50°.

12. The button according to claim 8, wherein the bottom cylindrical surface has a width within a range of 1 mm to 2 mm.

13. A fixation system of a strap to a camera, including a buckle according to claim 1.

14. A fixation system of a strap to a camera, including a button according to claim 8.

15. The buckle according to claim 1, wherein the first hole has a generally circular shape and is discrete from the through orifice.

* * * * *